(12) United States Patent
Lamontagne et al.

(10) Patent No.: US 7,684,105 B2
(45) Date of Patent: Mar. 23, 2010

(54) MICROBLINDS AND A METHOD OF FABRICATION THEREOF

(75) Inventors: Boris Lamontagne, Gatineau (CA); Christophe Py, Ottawa (CA)

(73) Assignee: National Research Council of Canada, Ottawa, ON (CA)

( * ) Notice: Subject to any disclaimer, the term of this patent is extended or adjusted under 35 U.S.C. 154(b) by 1065 days.

(21) Appl. No.: 11/359,421

(22) Filed: Feb. 23, 2006

(65) Prior Publication Data

US 2006/0196613 A1    Sep. 7, 2006

Related U.S. Application Data

(60) Provisional application No. 60/655,447, filed on Feb. 24, 2005.

(51) Int. Cl.
 *G02B 26/00* (2006.01)
(52) U.S. Cl. ......................... 359/290; 359/291
(58) Field of Classification Search ................. 359/290, 359/291
See application file for complete search history.

(56) References Cited

U.S. PATENT DOCUMENTS

| | | | |
|---|---|---|---|
| 3,989,357 A | 11/1976 | Kalt | |
| 4,266,339 A * | 5/1981 | Kalt | ............................. 29/829 |
| 5,784,189 A | 7/1998 | Bozler et al. | |
| 5,850,861 A | 12/1998 | Silverberg | |
| 6,590,267 B1 | 7/2003 | Goodwin-Johansson et al. | |
| 6,666,983 B2 | 12/2003 | Marietti et al. | |
| 6,692,646 B2 | 2/2004 | Kalt et al. | |
| 2002/0144831 A1 | 10/2002 | Kalt | |

OTHER PUBLICATIONS

Artificial Eyelid for Protection of Optical Sensors, Goodwin-Johansson et al, Dept. of Materials Science and Engineering, University of Florida, Gainesville, FL, MCNC, Research Triangle Park, NC NRL, Washington, D.C. pp. 225-231.
Advances in Material and Technology for Switchable Glazing—Dr. Carl M. Lampert—Star Science, Glass Processing Days, Jun. 13-16, 1999, Session 6, pp. 296 to 300.
Smart Switchable Material for the New Millennium—Windows and Displays—C.M. Lampert, Star Science, Santa Clara, CA—2000 Society of Vacuum Coaters—Denver Apr. 15, 2000 pp. 165-170.

* cited by examiner

*Primary Examiner*—Ricky L Mack
*Assistant Examiner*—James C Jones
(74) *Attorney, Agent, or Firm*—Marks & Clerk; Richard J. Mitchell (57) ABSTRACT

A microblind system has an array of overhanging stressed microblinds, each having an anchor portion attached a substrate and a mobile portion. The microblinds are responsive to electrostatic forces to mutate between a deployed configuration wherein the mobile portion obscure the substrate and a curled configuration wherein the mobile portion exposes the substrate. A transparent conductive layer permits the application of an electric field to the microblinds.

32 Claims, 6 Drawing Sheets a) Thin film deposition

Fig. 1a b) Patterning

Fig. 1b c) Release of the stressed layers

Fig. 3c a) Micro-blinds closed

Fig. 4a b) Micro-blinds open

MICROBLINDS AND A METHOD OF FABRICATION THEREOF

CROSS REFERENCE TO RELATED APPLICATION

This application claims the benefit of prior U.S. provisional application No. 60/655,447 filed on Feb. 24, 2005, the contents of which are herein incorporated by reference.

FIELD OF THE INVENTION

This invention relates to the field of light transmission control, and in particular to a microblind system for modifying the visible and/or infrared (IR) light transmission of surfaces, such as windows.

BACKGROUND OF THE INVENTION

Low emission coatings have been applied on windows to limit the transmission of IR (heat) through the windows. These coatings are very widespread; however they are characterized by fixed transmission characteristics. For optimal energy efficiency, windows should allow the transmission of IR in the winter so it contributes to heating the building, and block it in the summer to help the building stay cool. The amount of visible light should also be tuned to optimise the comfort of ambient conditions to users and minimize the amount of general lighting needed.

Smart windows, in which the light transmission through the window can be controlled, have been developed using electrochromic layers, liquid crystals and suspended particles. Automated blinds systems located between two glass panes or inside buildings have also been developed.

Current technology for smart windows, which is mainly based on the use of electrochromic layers, has severe limitations in terms of lifetime, speed, maximum IR transmission and visual aspect. Macroblinds have also very severe drawbacks such as cost, reliability and visual appearance.

Rolling electrodes have been employed in telecommunications applications as, for example, light modulators. Such devices typically have small dimensions, in the order of 1 mm to 1 cm.

SUMMARY OF THE INVENTION

The present invention provides microblinds for windows that modify-their visible and/or infrared transmission. This allows better comfort for the occupant as well as major energy savings in terms of heating and cooling costs.

Smart windows, in accordance with embodiments of the invention, are capable of varying the transmission characteristics depending on the solar radiation, the outdoor weather conditions and the different requirements of the users (for instance, high ambient light for a meeting, low ambient light for the projection of a film).

The invention provides a means to make smart windows by fabricating microblinds directly on a large scale substrate, such as a glass window pane or illuminated panel, or on an additional substrate that could be added to existing windows or panels. These microblinds are fabricated using a thin layer or thin layers under controlled stress, hereafter referred to as stressed layer. They are activated by electrostatic forces and can therefore be actuated either by an automated monitoring system (ambient light and/or temperature) or directly by the user. In the case of windows, they are intended to be applied to buildings, or in the case of an illuminated panel they could be applied to billboards. The term window as used herein thus means a transparent pane of the type that would typically be found in a building, or vehicle, such as an airplane, space vehicle, or automobile, for example, or that is designed to be looked through or at by a human occupant. Typically, such a window would have dimensions in the order of 1 m square, although it could be smaller. The microblinds can also be formed on a supporting layer to be applied to such a window, or also they could be applied to an illuminated panel, such as found on a billboard.

Thus according to one aspect of the invention there is provided a microblind system comprising an array of stressed microblinds, each having an anchor portion attached a substrate in the form of a window, illuminated panel, or supporting layer to be applied to a window or illuminating panel, and an overhanging mobile portion; said microblinds being responsive to electrostatic forces to mutate between a deployed configuration wherein said mobile portion obscures the substrate and a curled configuration wherein said overhanging mobile portion exposes the substrate; and a transparent conductive layer for applying an electric field to said microblinds.

In another aspect the invention provides a method of making a microblind system, comprising depositing a sacrificial release layer over a substrate in the form of a window, illuminated panel, or supporting layer to be applied to a window or illuminating panel having a transparent conductive layer; depositing a stressed layer with controlled stress over said sacrificial layer; patterning an array of microblinds on said stressed layer; selectively etching said sacrificial release layer to leave said microblinds with an overhanging mobile portion and an anchor portion, said microblinds being responsive to electrostatic forces to mutate between a deployed configuration wherein said overhanging mobile portion obscures the substrate and a curled configuration wherein said mobile portion exposes the substrate.

In one embodiment the invention provides microblinds for windows comprising a substrate, an adhesion promoter, diffusion barrier and insulator barrier deposited on said substrate, a transparent conducting layer deposited on said insulator layer, a second layer of insulator deposited on said transparent conducting layer, a release-sacrificial-anchoring layer deposited on said second layer of insulator, and a reflective, resilient and stressed layer or multilayers deposited on said release-sacrificial-anchoring layer, wherein microblinds are defined by patterning said resilient and stressed layers or multilayers having controlled optical properties.

In another embodiment the invention provides microblinds for use on a window comprising actuatable microblinds; an anchoring contact line connecting adjacent microblinds; an open area separating adjacent lines of microblinds, wherein said microblinds define an open transparent area when they are curled and the anchoring contact line defines an opaque area with the curled microblinds.

In yet another one embodiment the invention provides microblinds for use on a window comprising independently actuated microblinds; an anchoring contact track connecting adjacent microblinds, an open area separating adjacent columns of microblinds, wherein said microblinds define an open transparent area when they are curled and the anchoring contact track defines an opaque area with the curled microblinds.

In still another embodiment the invention provides an array of microblinds, where the dimension and/or the geometry of the microblinds may be varied.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1A:
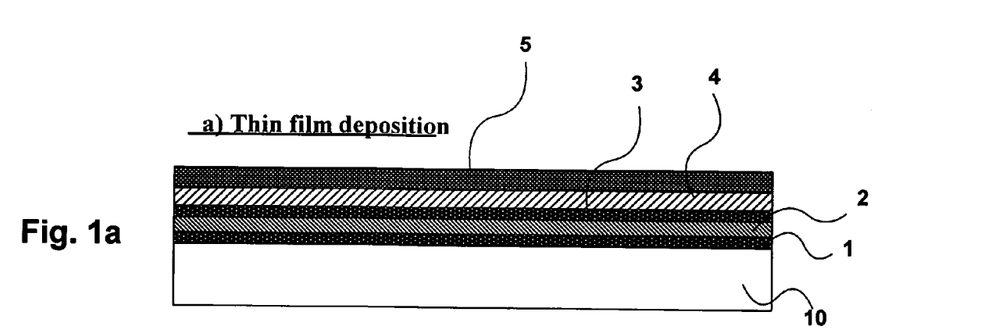
FIGS. 1a, 1b and 1c are cross-sectional views illustrating a method of fabricating an embodiment of the present invention.
Figure 1B:
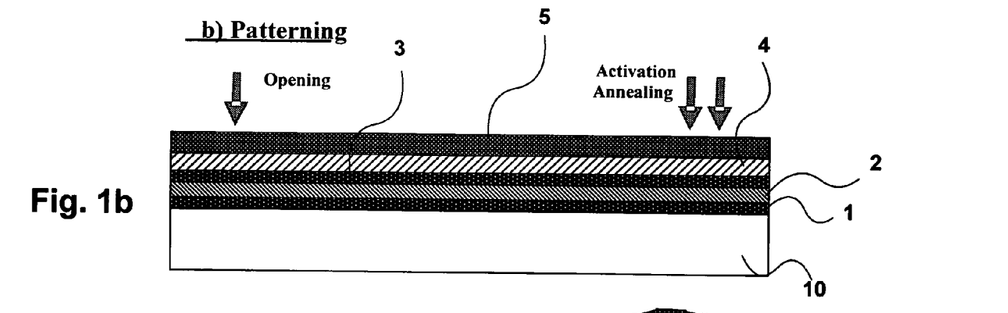
Figure 1C:
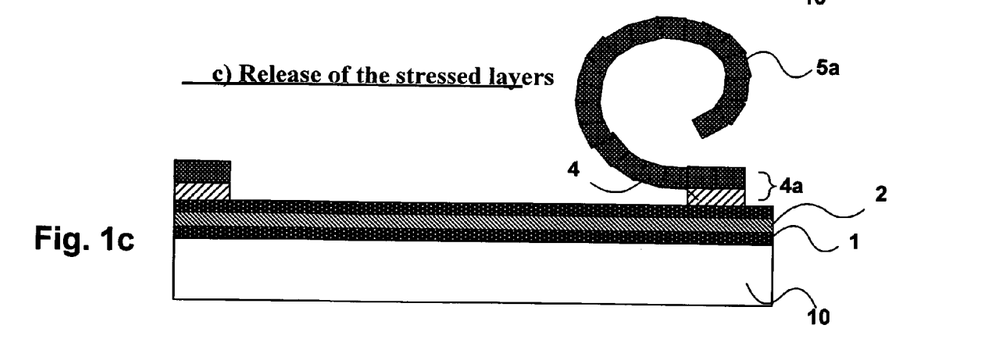

FIGS. 1a to 1c are cross-sectional views of the microblinds showing the three major fabrication steps: deposition of the thin films with a controlled stress, patterning and then release of the stressed layers. The various layer numbers are defined as a substrate 10, an insulator, a diffusion barrier and/or adhesion promoter layer 1; a transparent conducting layer 2; an insulator layer 3; a release-sacrificial-anchoring layer 4; and a reflective, resilient and stressed layer 5. The stressed layer 5 may comprise a plurality of sublayers.

The fabrication process consists of depositing and patterning a number of layers on a clean substrate. The substrate is preferably glass but any substrate substantially transparent in the visible spectrum may also be used, including plastic foils. The process optionally comprises the deposition of a diffusion barrier, adhesion promoter and insulator layer 1 on the substrate 10, which may be a window pane, an illuminated panel, or a supporting layer to be applied to a window pane or illuminated panel. The layer 1 could, for example, be a combination of Ti and TiNx.

This is followed by the deposition of a transparent conducting layer 2, for example, ITO, SnO, ZnO, a thin Ag layer or a semi-transparent stack of Ti and Au. Layer 2 should be reliable, cheap and preferably transparent throughout the visible spectrum and up to a wavelength of 2-3 µm to allow solar heat gain when the blinds are opened. Being hard can also be advantageous. Chemical vapour deposited SnO doped with F is a good choice.

The next step is the deposition of another insulator layer 3, for example $SiO_2$. Layer 3 should be such that the leakage current between layer 2 and layer 5 is low. The insulator layer can be a polymer or a dielectric like silicon dioxide, silicon nitride, carbon nitride, silicon carbide, titanium oxide, aluminium oxide and others.

Layer 3 is followed by the deposition of a release-sacrificial-anchor layer 4, for example Si or W. Layer 4 should give a very strong contact or anchoring point for the microblinds. It also should be readily partially removed during the fabrication process to release the microblinds and allow them to curl as a result of their inherent stress.

Finally, the deposition of layer 5, which has controlled optical properties and forms the microblinds, is carried out.

Layer 5 modulates the light through the window and should therefore have controlled optical properties, that is, controlled transmission and reflection. For example, it could have high reflectance to visible light to provide a high opacity window when all the microblinds are closed, or high transmittance to visible light and high reflectance to IR in order to allow the modulation of heat through the window pane without affecting the ambient light. In addition, layer 5 should comprise an electrically conductive layer so the blinds can close by the attraction of an electrostatic force provided by layer 2.

The stress in layer 5 is important. It can result from different coefficients of thermal expansion in different sublayers or from intrinsic stress induced by the deposition method itself. For example, using sputter deposition, a stress gradient can be introduced in the films by varying the deposition conditions. All these layers can be deposited using common technologies (dip coating, evaporation, CVD, PECVD or sputtering) for the flat glass manufacturing industry. The right choice of materials and deposition methods depends on the targeted performances.

Stressed layer 5 should be thin to allow a small radius of curvature and thus high transparency of the windows when all blinds are opened. Ideally, the materials should be resilient (not brittle or too ductile) to resist the fatigue of multiple actuations and have the long lifetime expected of a window pane. The total thickness of these layers will be provided such that they remain cost effective, provide reliable mechanical structure and are thick enough to reflect or absorb light. The total thickness of all the layers 5 is preferably between 0.1 and 10 µm. The thickness of the stressed layers is about ¼ of the total thickness of the layers.

To obtain the curling behaviour from stressed layer 5, two sublayers with different stresses may be required, although it is possible to fabricate a single layer with graduated stress. It is the differential stress that makes the layer curve. In the embodiment, the stressed layer 5 consists of a chromium layer with a tensile stress of around 1 GPa and an SiNx layer with a compressive stress of around 1 GPa. This creates a stress difference of 2 GPa. The stressed layer 5 could also be made of Ta, W or other metals or alloys. Typically two layers are employed, composed of metal, dielectric or polymer. The stress difference can be intrinsic (growth-induced) or induced by different coefficients of thermal expansion between sublayers. Specific examples include: PECVD SiNx and sputtered Cr; two layers of sputtered Cr; and tungsten and polyimide.

Subsequently, microblinds are defined by patterning layers 5, 4 and 3. This results in a structure shown in FIG. 1c, where the mobile portion 5a of the stressed layer 5 is shown in the curled configuration. The residual portion of layer 4 forms the anchor line for the mobile portion 5a. As will later become apparent, layer 2 may be patterned as well. For the fabrication over large area using laser patterning, a suitable composition for stressed layer 5 is a bilayer of Cr, wherein a lower sublayer is deposited in compressive mode, and an upper sublayer is deposited in tensile mode. Selecting the deposition conditions (such as the pressure of Ar) allows the operator to choose the stress level in the deposited film.

The substrate is assumed to be a flat glass pane, but could also be plastic (roll or foil). The fully processed plastic foils could be installed later between the two glass panes of the windows (laminated or suspended). It could also be an illuminated translucent panel for use as a sign or billboard.

The properties of the various layers can be tuned to satisfy customer requirements (visible and IR transmission characteristics).

Patterning of the microblinds can be accomplished by any method known to those skilled in the art, including standard optical lithography. However, owing to the large dimensions involved, some methods are particularly advantageous: micro-templating using very large rollers with a mold, laser patterning or a combination of those methods or others. The first technique is being developed very actively by the nano-industry [Y. Xia and G. M. Whitesides, Soft lithography, Angew. Chem. Ed., 37, 550-575, 1998]. It involves a soft material to imprint the microblind geometry. The second technique is available for very large area patterning [P. T. Rumsby, IMID'02 Digest, p. 1, Korea, 2002; www.exitech.co.uk], especially for the display industry.

By rastering a focused laser beam on the surface of the deposited stack, one can stimulate the etching or ablate the stressed layer in order to define the microblinds and to make an opening for a further removal of the release layer. A laser can also be used to activate/anneal the release layer at the contact point ["Laser Assisted Micro-technology", S. M. Metev and V. P. Veiko, Springer, 1998]. For example, under a laser beam a release layer made of Si can thermally and locally react with the other layers to become a silicide thus changing its properties. The removal of the release layer could be done by wet or dry etching, for example a Si layer could be etched under an $SF_6$ plasma or a $XeF_2$ atmosphere or alkali-hydroxide bath, while the silicide formed by the local annealing process would not be affected by it and would remain intact. The end of the etching could be controlled by time or by the annealing of the contact point.

Figure 2A:
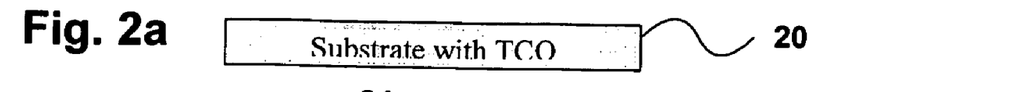
FIGS. 2a to 2g illustrate in more detail the process steps involved in the manufacture of microblinds in accordance with an embodiment of the invention.

An exemplary process, illustrated in FIGS. 2a to 2g, for making the microblinds using conventional lithography is as follows:

First a commercially available TCO (transparent conductive oxide) layer on a glass substrate 20, preferably SnOx:F doped, is prepared. The use of a TCO-coated substrate avoids the need for separate deposition of a transparent conductive layer. If no dielectric-insulator is present at the surface, a thin sputtered or PECVD-deposited dielectric may be added.

Figure 2B:
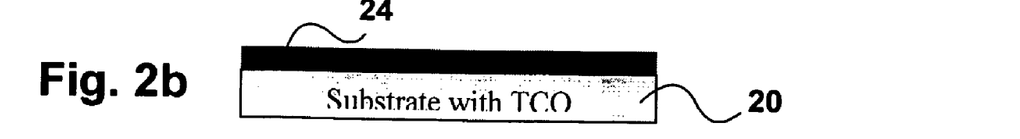

A release layer 24 is deposited by sputtering or PECVD. layer 24 should be such that it can be removed locally later by dry or wet etching, and should have the potential to react by thermal activation with the stressed layer to form a strong compound with good etching selectivity.

Figure 2C:
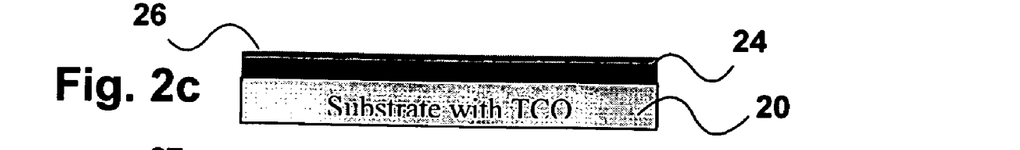

An extra dielectric layer 26 is deposited by sputtering or PECVD. This is required for photolithography (but not for a laser process to be described below). This layer spatially limits the later thermal reaction.

Figure 2D:
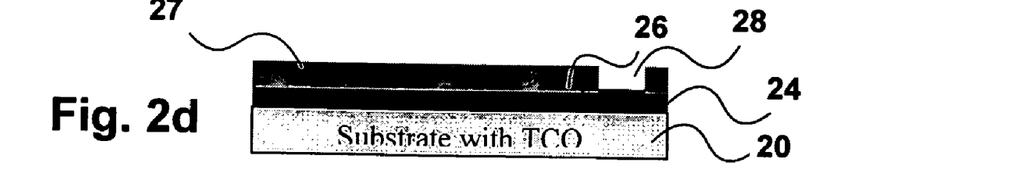

Next, as shown in FIG. 2d, a first photo-lithography patterning step is performed with a mask 27 to pattern the anchor lines, following which a wet or dry etch is performed to etch trenches 28 in the dielectric layer 26 at locations where the anchor lines will be formed.

Figure 2E:
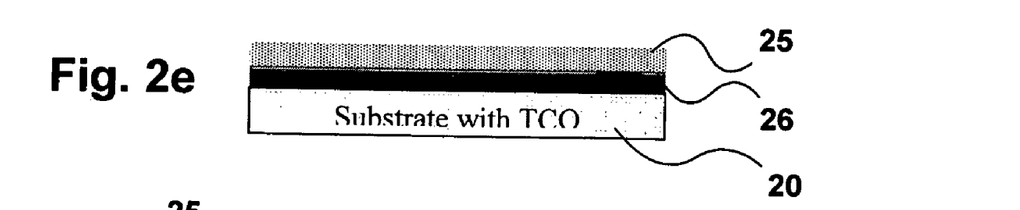

The stressed layer 25 is deposited as shown in FIG. 2e. Sputter deposition is used to first deposit sublayers in compressive stress and then sublayers in tensile stress. The variables used to control the stress include pressure, distance, power and partial pressure of oxygen or nitrogen.

Figure 2F:
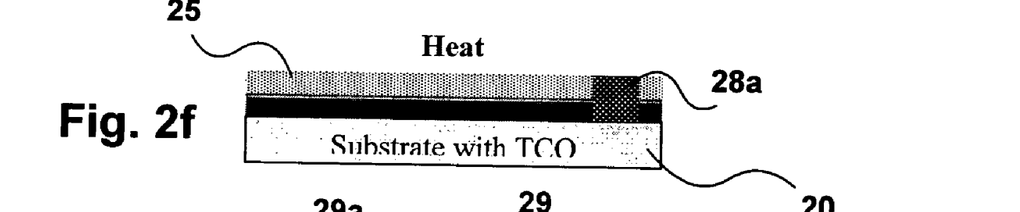

Next follows the thermal activation between the release layer and the compressive layer at the anchor lines, by rapid thermal anneal as shown in FIG. 2f. This creates strong ridge anchor lines 28a, by interaction between the stressed layer 25 and the release layer 24. These anchor lines serve as anchors for the mobile portions 25a of the microblinds. This step is followed by a second patterning step with a mask 29 to define the mobile portions 25a microblinds photolithographically without critical contact-alignment.

Figure 2G:
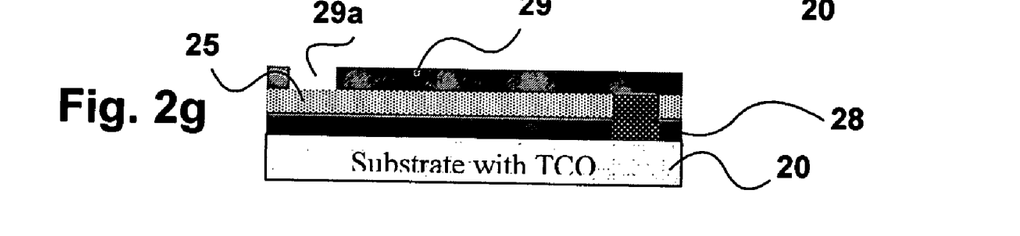

The stressed layer 25 and dielectric layer 26 are then etched through the aperture 29a, preferentially by dry etching.

Finally, the release layer 24 is etched by wet or dry etching to leave an overhanging mobile portion 24a attached to the substrate 20 along ridge line 28a providing an anchor portion.

Electrical contacts can be deposited at the edges of the pane to apply an electrical voltage between the conductive sublayer and the stressed layer 25.

Operational details of a specific lithographic process are as follows:

Sample Preparation blue tape on coating side (without the sticker)

scribe-cleave in Thin Films polish the edges using sand paper, mark on back clean using soap, iso-acetone-DI-blow dry
High Quality P.E.C.V.D 1) $SiO_2$ (~0.2 μm) high quality-high breakdown volt.

2) a:Si (~0.1 μm for sample SiG-SG #1-2)

3) $SiN_x$ compressive (~0.05 μm=500 A)

Process Conditions:

1) $SiO_2$ high quality: Oxford-high temp 2) a:Si: Oxford recipe

3) $SiN_x$:

Spin Coating SPR510A a) vapour prime, HMDS, 1 min b) spin SPR510A, (800, 2 sec) 5000 rpm, 30 sec.

c) bake 5 min at 110 C

Exposure

Edgebead Removal:

Expose 3 min at 14 mW/cm2, 365 nm

Develop 1 min 15 sec in Shipley 321 with agitation

Rinse in DI and blow dry

Pattern Sample with Mask: Microblinds (Field with Lot of Lines Off-Center)

Expose 9 sec at 14 mW/cm2,

Develop 45 in Shipley 321 with agitation

Rinse in DI and blow dry

Postbake-RS

RS for 15 min

100° for 15 min

RS for 15 min

120° for 15 min

Characterization

Microscope

Dry etching the $SiN_x$, ICP1, 10 mtorr, 500 W, 50 W (120V), 10 O2, 30 C4F8, 20 deg, 500 A/min Dektak (w and w/o PR)+Microscope

Removal of the PR Mask

Jupiter, 20 min, 50 W

Sputter Deposition

Deposition of the Cr stress layers: compr. then tens.

1) HF:H2O, 1:100, ~15 sec., DI rinse, blow dry 2) compressed layer: ~0.1 μm, ~1 Gpa, 2 mtorr

Characterization

Microscope

Rapid Thermal Annealing (RTA)

RTA, N2, 400° C., 60 sec

Characterization

Microscope

Spin Coating SPR510A a) vapour prime, HMDS, 1 min b) spin SPR510A, (800, 2 sec) 5000 rpm, 30 sec.

c) bake 5 min at 110 C

Exposure

Edgebead Removal:

Expose 3 min at 14 mW/cm2, 365 nm

Develop 1 min 15 sec in Shipley 321 with agitation

Rinse in DI and blow dry

Pattern Sample with Mask: Microblinds (Center Field)

Expose 9 sec at 14 mW/cm2,

Develop 45 in Shipley 321 with agitation

Rinse in DI and blow dry

Postbake-RS

RS for 15 min

100° for 15 min

RS for 15 min

120° for 15 min

Characterization

Microscope

Wet etching the SiO2 layer in BOE 6:1 30 sec.

Microscope

Wet etching the Cr layer in Cr4s 60 sec.?

Jupiter 10 min (PR removal)

Dry etching the SiNx layer C4F8 ICP plasma

Etching the Si Sacrificial Layer 1) selective wet etching using KOH-IPA or EDP . . .

or 2) dry etching using SF6 plasma, ICP1 . . .

Removal of the PR Mask

Jupiter, 20 min, 50 W

Back Dicing Then Cleaving

Figure 3A:
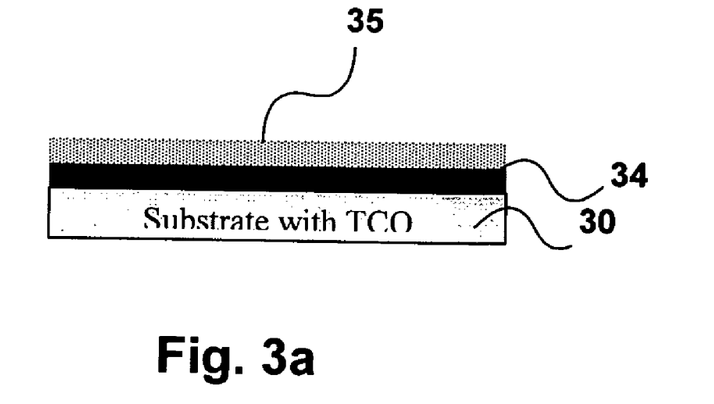
FIGS. 3a to 3c illustrate the process steps involved in an alternative embodiment of the invention.

An alternative method to lithography, especially for large area, is to use laser processing techniques. In this case the following steps are carried out as described in FIGS. 3a to 3c:

The substrate 30 is coated with commercially available TCO, preferably SnOx:F as in FIG. 2a. If no dielectric-insulator, corresponding to layer 3 in FIG. 1a, is present at the surface, a thin sputtered or PECVD-deposited dielectric may be added.

A release layer 34 (FIG. 3a) is deposited to form the same structure illustrated in FIG. 2b by sputtering or CVD.

Figure 3B:
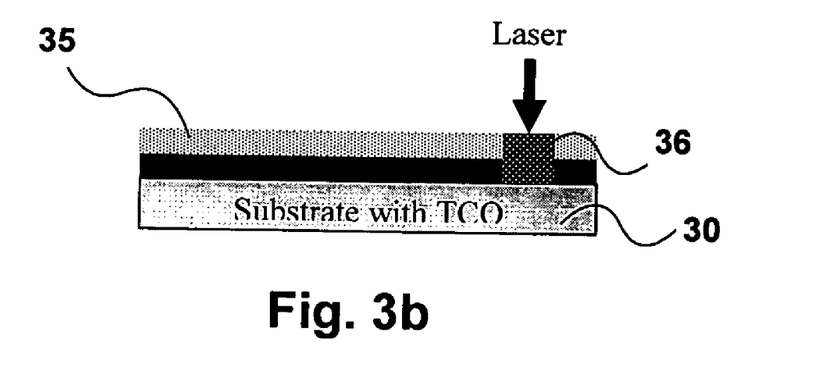

The stressed layers 35 are deposited by sputter deposition of the compressive layers followed by the tensile layers. The variables include pressure, distance, power and partial pressure of oxygen or nitrogen Next, as shown in FIG. 3b, laser thermal activation is carried out to initiate interdiffusion of the release-stress layers at the ridge line 36. This creates the anchor portions of the microblinds to be formed.

Figure 3C:
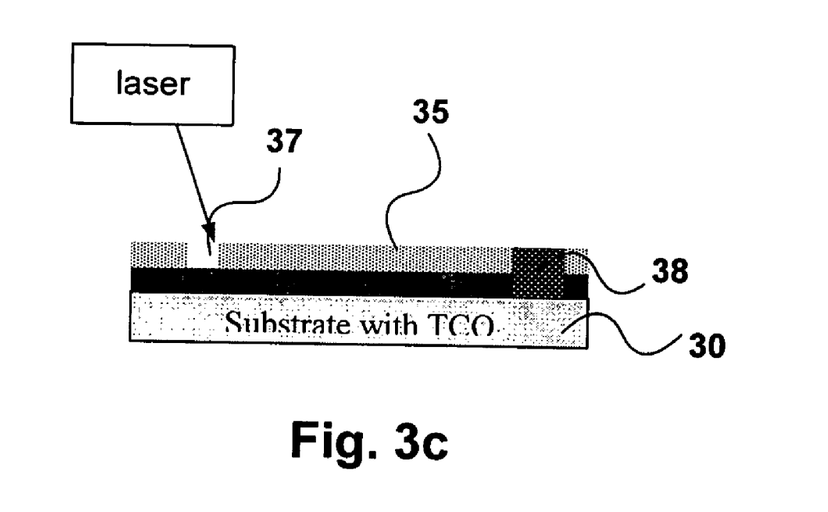

This step is followed, as shown in FIG. 3c, by laser patterning of the microblinds, using laser stimulated etching or ablation of the stress layers. This opens trenches 37 to the release layer 34. Finally, wet or dry etching can be performed on the release layer 34 to form the mobile portions 35a of the microblinds.

As in the embodiment described with reference to FIGS. 3a to 3g, electrical contacts can be deposited at the edges of the pane to connect to the conducting sublayer within stressed layer 35. Electrical connection to the transparent conductive oxide can be done through substrate.

The layers (dielectric, release, stressed) can be deposited in three consecutive sputter deposition chambers; or simply in the same chamber by using different targets and/or gases. The total thickness of these three layers could be as small as 500 A. uniformity is not critical.

Figure 4A:
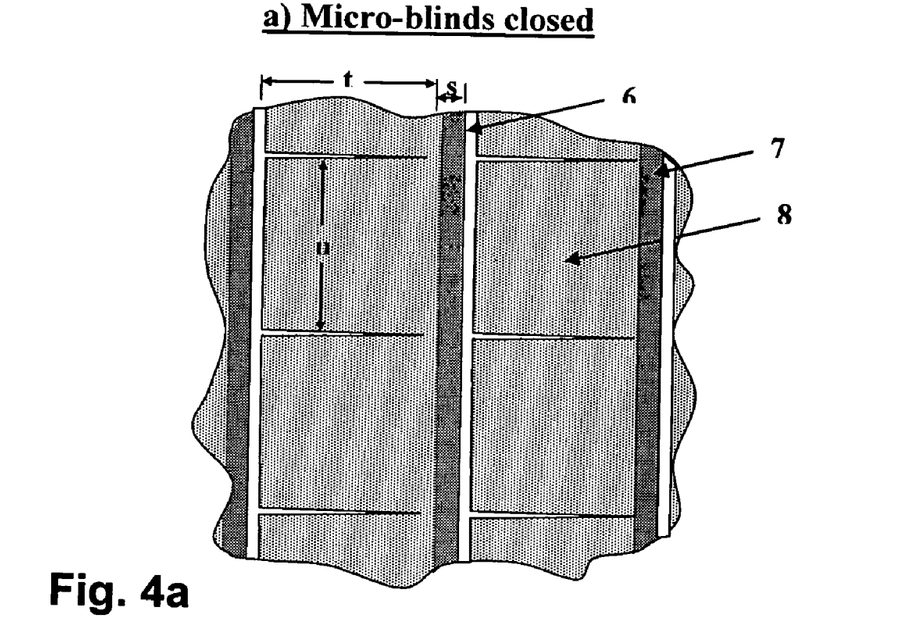
FIGS. 4a and 4b are top schematic views of an embodiment of the present invention.
Figure 4B:
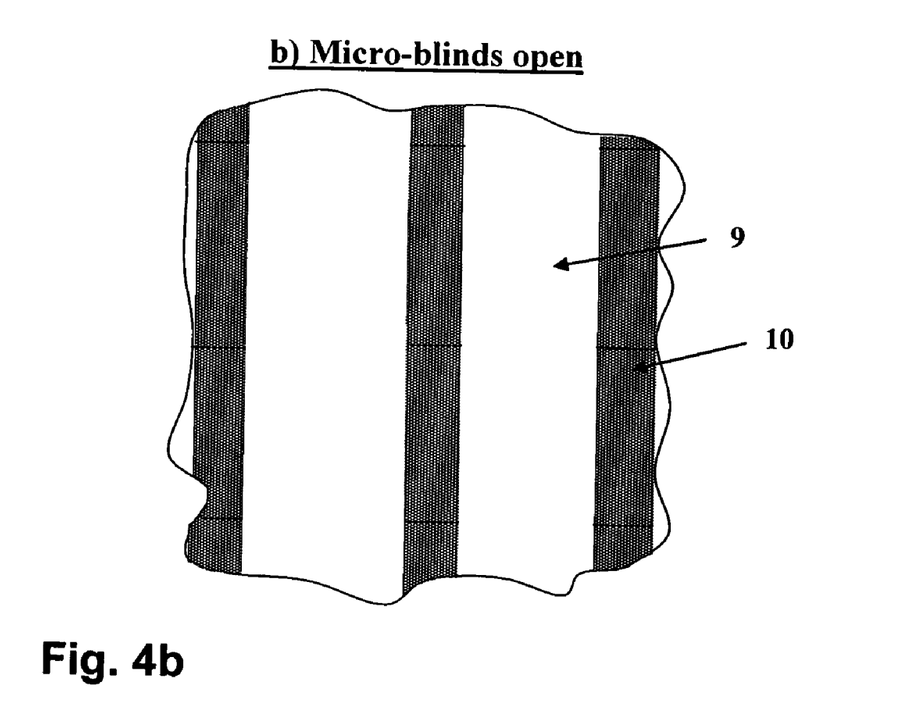

FIGS. 4a and 4b show the microblinds respectively in the closed and open states. Once released, the mobile portions of the microblinds curl by themselves due to the inherent stress, which defines the open state. To close them, a voltage is applied between layer 2 and stressed layer 5 (shown in FIGS. 1a to 1c), or in the case of a TCO-coated substrate, the substrate and the stressed layer 5. The voltage must be high enough that the electrostatic attraction exerted by layer 2 is larger than the inherent stress that induces the curling of stressed layer 5. The value of the actuation voltage is proportional to the stress and the thicknesses of the release layer and insulator. The voltage is applied by contacting layer 2 and stressed layer 5 to outside electrical sources through contacts arranged on the edge of the frame, preferably hidden in the frame so as to be invisible to the viewer.

In FIGS. 4a and 4b, the open area between microblinds is referenced 6, the anchor ridge, which can also serve as an electrical contact, is referenced 7, the mobile portion is referenced 8, the open-transparent area, in the open state, is referenced 9, and the opaque area, in the open state is referenced 10.

In an embodiment, the open area between microblinds 6 could extend in a straight line from one end of the window pane to the other. As a result, the anchor contact 7 extends into columns of tracks, and the microblinds are electrically separated in columns and can therefore be actuated in columns when each column is contacted to a separate voltage source. Each column of microblinds can thus be independently controlled. The advantage of this embodiment will become apparent later for grey level modulation of light through the window. In another embodiment, transparent conducting layer 2 could be organised in rows across the columns of anchor contacts 7 (for example at an orthogonal angle) and extending through the window pane. This forms an array. In a manner similar to flat panel displays, each microblind could thus be independently actuated [S. Sherr, Electronic Displays, 2nd Edition, John Wiley & Sons, 1993]. This configuration can advantageously be used to provide grey level with additional refinement, and allow the window pane to be used as a display, as will later become apparent.

An advantage of the present invention resides in the fact that the microblinds can be made invisible to the eye, and render the smart windows colourless. The dimensions and geometry of each microblind can vary, but typically lie in the range of about 50 to 150 µm. In one smart window all the microblinds can have the same dimensions, for example 80×150 µm; or they could vary, for example by rows: for example a first row having microblinds of 80×150 µm, the next row of 90×150 µm, and the next at 95×150, and next at 100×150 µm, to then start the cycle again with a row at 80×150, or randomly. Each square meter of such smart window would be made of ~100 millions of microblinds.

Partial opening of the window pane, or grey levels, can be obtained by using different geometry-size of microblinds and having means of actuating them independently.

Figure 5A:
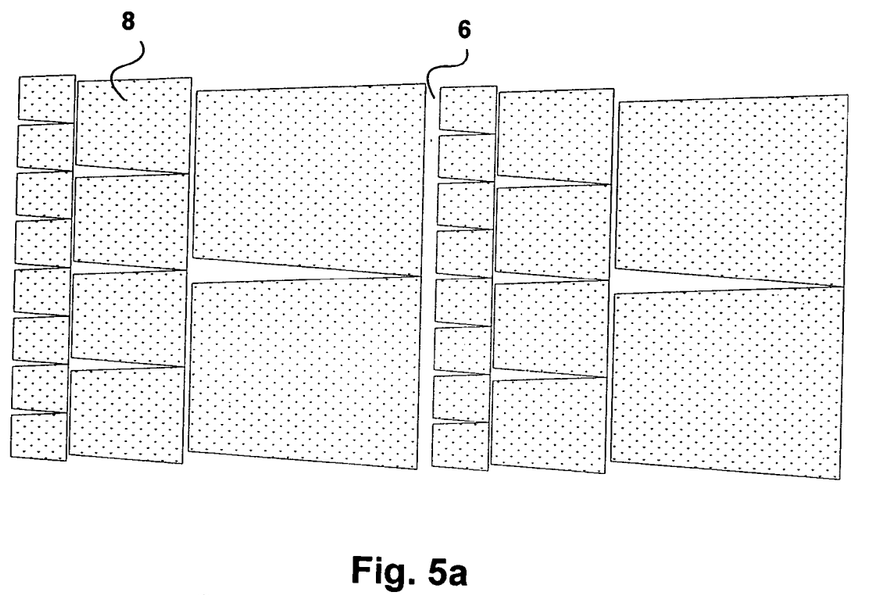
FIGS. 5a and 5b are top schematics view of other embodiments of the invention.

In the particular example of FIG. 5*a*, open areas 6 between microblinds are arranged in columns, thus forming columns of microblinds and associated anchor-contact tracks 7. The 1 st and 4$^{th}$ columns have microblinds of equal sizes, the 2$^{nd}$ and 5$^{th}$ columns have microblinds twice as wide and tall, and the 3$^{rd}$ and 6$^{th}$ four times as tall and wide. Opening all the blinds of the 1$^{st}$ and 4$^{th}$ columns, but leaving all others closed, will result in a transmission of roughly ⅐ of the outside light through the area depicted; opening all the blinds of the 2$^{nd}$ and 4$^{th}$ columns, but leaving all others closed, will result in a transmission of roughly ⅔ of the outside light through the area depicted; opening all the blinds of the 1$^{st}$, 2$^{nd}$, 4$^{th}$ and 5$^{th}$ columns, but leaving all others closed, will result in a transmission of roughly 3/7 of the outside light through the area depicted; opening all the blinds of the 3$^{rd}$ and 6$^{th}$ columns, but leaving all others closed, will result in a transmission of roughly 4/7 of the outside light through the area depicted; and so on. It is to be understood that not all microblinds within a given column need to be opened together: if microblinds were addressed individually by arranging transparent conducting layer 2 in rows across the columns of anchor-contact tracks 7, any combination of them could be left open or closed to create a very large number of grey levels.

It is also to be understood that the dimensions of microblinds need not have a geometric progression: grey levels could be obtained with any distribution of dimensions, including having all blinds of the same size, as long as some of the blinds can be actuated independently from some others.

A particular advantage of having microblinds of different dimensions is to overcome the possibly deleterious effect of diffraction of light through periodic structures, for example the Moire effect. The Moire effect is observed when superimposing a repetitive design, such as a grid, on the same or a different design in order to produce a pattern distinct from its components. If such a periodic structure were to be observed through a smart window whose microblind array is normally invisible to the user, that periodic structure may appear to the viewer different than if it was not viewed through the window. That undesirable effect is overcome by arranging the microblinds array in a non-periodic structure.

Figure 5B:
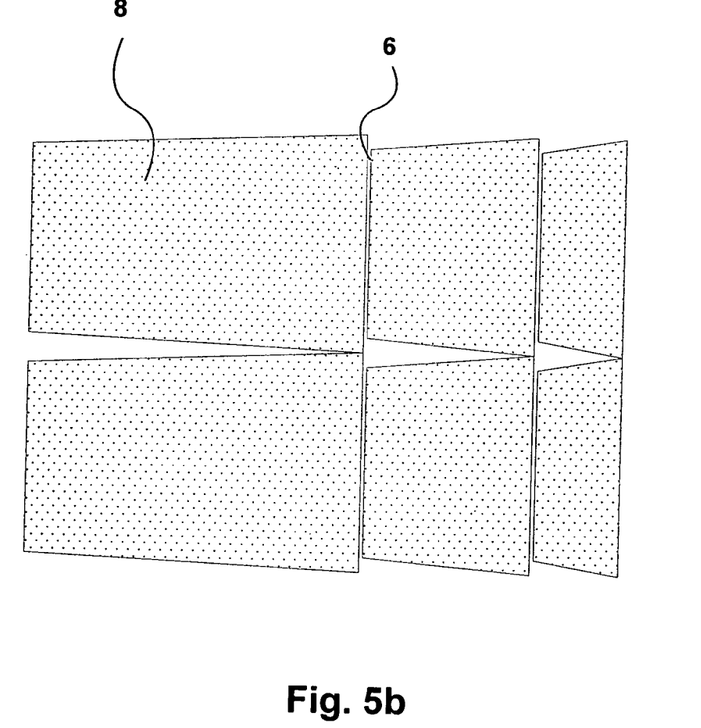
Figure 6:
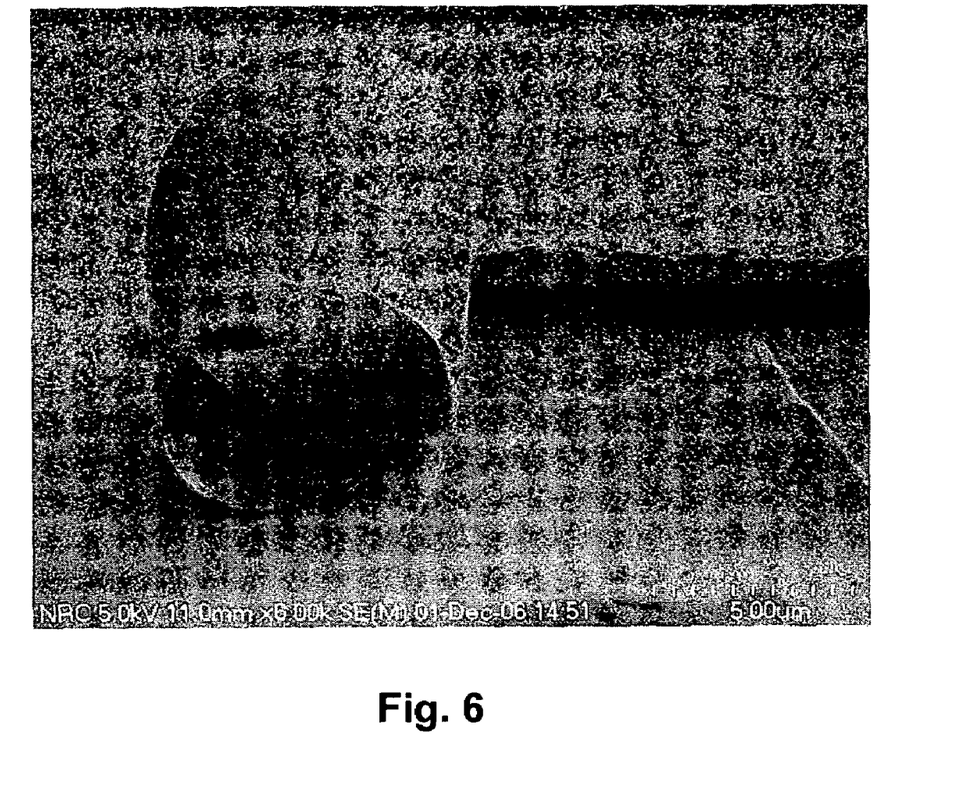
FIG. 6 is a micrograph image of curled microblinds

In addition, grey levels can be obtained without addressing columns separately by taking advantage of the fact that the voltage needed to open the microblinds depend on their geometry, that is, their area and shape, for example square, rectangular, trapezoidal or any other practical shape. FIG. 5*b* shows an embodiment where a first column (to the left) has blinds that are twice as long as they are wide and will be actuated by a voltage V1; the second column has substantially square microblinds and will be actuated by a voltage V2, and the third column has microblinds that are twice as wide as they are long and will be actuated by a voltage V3. Because of the different geometries of the microblinds, we have: V1>V2>V3. When applying a voltage V to the entire smart window area such as V3<V<V2, only the third column of microblinds will be opened, resulting in this area of the smart window to transmit roughly ⅐ of the outside light. When applying a voltage V to the entire smart window area such as V2<V<V1, only the second and third column of microblinds will be opened, resulting in this area of the smart window to transmit roughly 3/7 of the outside light. When applying a voltage V to the entire smart window area higher than V1, all three columns of microblinds will be opened, resulting in this area of the smart window to transmit most of the outside light. In this embodiment, grey levels in the transmission of the smart window can be simply obtained by one outside voltage source with a voltage that can be tuned.

In order to obtain partial openings (grey level), it is also possible to make some microblinds opening at slightly different external voltage by varying the resistivity of the anchor-contact tracks 7. The voltage at the microblinds depends on the external voltage applied but also on the voltage drop between these two points. The voltage drop is proportional to the current and the resistivity of the anchor-contact tracks 7. Very low currents are associated to these devices, so the main variable is the resistivity of the anchor-contact tracks 7 between the microblinds on a column. By narrowing the effective width of the anchor-contact tracks 7 (especially near the edges of the window), it is easy to design tracks that are more resistive than others, thus requiring higher external voltage than adjacent rows to open the microblinds.

In addition, grey levels may be obtained by switching the microblinds between states at a speed high enough to be undetected by users. The display industry has developed a very good understanding of the response of the human eye to varying images; in particular, it is known that the human eye doesn't detect flickering at a video rate of 100 Hz. Varying the duty cycle at speed higher than 100 Hz therefore allows grey levels. For example, the smart window of the present invention can have a 50% grey level if the microblinds are opened and closed every 10 ms.

Induced non-uniformities in the microblinds stress also allow partial opening. Higher stress near the contact point induced by the release process or laser beam facilitates the variable opening. Moreover, non-uniform patterning on the window can be used to allow preferential opening of specific area, for example opening the bottom of the window first or with a higher transparency.

Another possibility for an extra functionality is addressing the microblinds individually or in an array arrangement as described by the display industry [S. Sherr, Electronic Displays, 2nd Edition, John Wiley & Sons, 1993]; Regular windows could thus become displays to the inside users when there is light outside or to outside viewers when the illumination inside the building is sufficiently higher than the ambient outside light (for example, at night). Even without addressing the microblinds, the windows on large commercial buildings could be addressed individually to become displays to outside viewers. During the evening, high rises or large buildings would thus become huge advertisement boards.

The invention claimed is:

1. A microblind system comprising:
   an array of microblinds, each comprising a stressed conductive layer having an anchor portion attached a substrate in the form of a window, illuminated panel, or supporting layer to be applied to a window or illuminating panel, and an overhanging mobile portion;
   said stressed conductive layer being naturally in a curled configuration and being responsive to electrostatic forces to mutate between a deployed configuration wherein said overhanging mobile portion obscures the substrate and said curled configuration wherein said overhanging mobile portion exposes the substrate; and
   a transparent conductive layer for applying an electric field to said microblinds, and
   wherein said anchor portions are in the form of a region comprising said stressed layers interdiffused with a remnant of a sacrificial layer.

2. The microblind system of claim 1, wherein said microblinds comprise a plurality of stressed sublayers, at least one of which is conductive, and wherein said stressed sublayers include a sublayer in tensile stress and a sublayer in compressive stress.

3. The microblind system of claim 2, wherein at least one of said sublayers is chromium.

4. The microblind system of claim 3, wherein at least one of said sublayers is SiNx.

5. The microblind system of claim 1, wherein said microblinds are arranged in subarrays, and groups of microblinds within each subarray have different dimensions.

6. The microblind system of claim 5, wherein the groups of microblinds in each subarray form columns.

7. The microblind system of claim 1, wherein said microblinds are arranged in subarrays, and wherein individual microblinds or groups of said microblinds within each subarray are separately addressable.

8. A microblind system comprising:
   an array of stressed microblinds, each having an anchor portion attached a substrate in the form of a window, illuminated panel, or supporting layer to be applied to a window or illuminating panel, and an overhanging mobile portion;
   said microblinds being responsive to electrostatic forces to mutate between a deployed configuration wherein said overhanging mobile portion obscures the substrate and a curled configuration wherein said overhanging mobile portion exposes the substrate; and
   a transparent conductive layer for applying an electric field to said microblinds, and
   wherein the microblinds are arranged in subarrays, and groups of microblinds within each subarray have anchor portions with different resistivities.

9. The microblind system of claim 1, wherein said mobile portions are generally rectangular flaps that in their natural state curl back over the anchor portions.

10. The microblind system of claim 1, wherein said substrate is coated with a transparent conductive oxide.

11. The microblind system of claim 1 applied to a window pane.

12. The microblind system of claim 1, wherein said microblinds have dimensions in the range from about 50 to 150 μm.

13. A method of making a microblind system, comprising:
    depositing a sacrificial release layer over a substrate in the form of a window, illuminated panel, or supporting layer to be applied to a window or illuminating panel and having a transparent conductive layer;
    depositing a conductive stressed layer on to said sacrificial release layer while controlling the deposition conditions to induce stress in said stressed layer;
    patterning an array of microblinds on said conductive stressed layer; and
    selectively etching away said sacrificial release layer under a major portion of said stressed layer to leave said microblinds with a curled overhanging mobile portion and an anchor portion, and
    wherein said microblinds are responsive to electrostatic forces to mutate between a deployed configuration wherein said overhanging mobile portion obscures the substrate and said curled configuration wherein said mobile portion exposes the substrate.

14. The method of claim 13, wherein said conductive stressed layer comprises a plurality of sublayers, at least one of which is conductive, and wherein the deposition conditions for each sublayer are controlled to introduce differential stress between said sublayers.

15. The method of claim 13, wherein said stressed layer comprises a conductive layer with graduated stress across its thickness.

16. The method of claim 13, further comprising selectively treating said sacrificial release layer and said stressed layer in a region to form said anchor portion.

17. The method of claim 16, further comprising, prior to depositing said stressed layer, depositing a protective layer over said sacrificial release layer, and etching a trench through said protective dielectric layer at the location of said anchor portion, and after depositing said stressed layer applying heat to interdiffuse said stressed layer and sacrificial layer to form said anchor portion.

18. The method of claim 17, wherein said heat is applied in the form of a rapid thermal anneal.

19. The method of claim 17, further comprising patterning said microblinds, and subsequently etching said sacrificial release layer to form said mobile portions.

20. The method of claim 13, wherein the substrate is coated with a transparent conductive oxide.

21. The method of claim 13, wherein a laser is applied to linear regions of said stressed layer over said sacrificial release layer to create said anchor portions by inducing interdiffusion between said sacrificial release layer and said stressed layer.

22. The method of claim 13, further comprising patterning said microblinds with a laser and subsequently etching said sacrificial release layer to form said mobile portions.

23. The method of claim 13, wherein said microblind system is formed on a window pane.

24. The method of claim 13, wherein said microblinds are patterned in subarrays having different dimensions.

25. The method of claim 24, wherein said subarrays are columns of said array.

26. A method of controlling the light transmission from a window or illuminated panel, comprising:
   providing an array of microblinds on said window or illuminated panel, said microblinds being responsive to electrostatic forces to mutate between a deployed configuration wherein said overhanging mobile portion obscures the window or illuminated panel and a curled configuration wherein said overhanging mobile portion exposes the window or illuminated panel;
   applying an electric field to said microblinds to control light transmission through said window or from said illuminated panel,
   wherein said electric field is rapidly switched between on and off states to create and intermediate state where the window or illuminated panel partial transmission exhibits partial transmission between the on and off states.

27. The method of claim 26, wherein subarrays of microblinds are formed with different dimensions.

28. The method of claim 26, wherein subarrays of microblinds are addressed separately.

29. The method of claim 28, comprising addressing the subarrays of microblinds differently so as to that the microblinds of some subarrays are in the deployed configuration and the microblinds of other subarrays are in the curled configuration in order to create a partially transparent window.

30. The method of claim 28, comprising addressing the subarrays of microblinds differently in a predetermined fashion so as to create a visible pattern.

31. The method of claim 27, wherein said the dimensions of the microblinds associated with the respective subarrays form a geometric progression.

32. The method of claim 14, wherein said stress layer comprises a structure selected from the group consisting of two sublayers of chromium and a sublayer of chromium and a sublayer of SiNx.

* * * * *